United States Patent [19]
Lee

[11] Patent Number: 5,343,766
[45] Date of Patent: Sep. 6, 1994

[54] SWITCHED CAPACITOR TRANSDUCER

[75] Inventor: Chen Y. Lee, Fort Wayne, Ind.

[73] Assignee: C & J Industries, Inc., Fort Wayne, Ind.

[21] Appl. No.: 841,363

[22] Filed: Feb. 25, 1992

[51] Int. Cl.$^5$ ............................................... G01L 1/00
[52] U.S. Cl. ............................... 73/862.61; 73/517 B
[58] Field of Search ............ 73/718, 862, 626, 517 R, 73/862.61, 517 B, 718

[56] References Cited

U.S. PATENT DOCUMENTS

| | | | |
|---|---|---|---|
| 4,791,352 | 12/1988 | Frick et al. | 73/718 |
| 5,054,320 | 10/1991 | Yvon | 73/517 B |
| 5,083,091 | 1/1992 | Frick et al. | 73/724 |
| 5,150,275 | 9/1992 | Lee et al. | 73/724 |

OTHER PUBLICATIONS

"A Switched-Capacitor Interface for Capacitive Pressure Sensors", Yamada et al.; IEEE Trans. Instr. and Meas., vol. 41, No. 1 (1992).

"Switched-Capacitor Frequency-to-Voltage and Voltage-to-Frequency Converters Based on Charge-Balancing Principle", Matsumoto et al., ISCAS, IEEE 2221, (1988).

Primary Examiner—Richard E. Chilcot, Jr.
Assistant Examiner—R. Biegel
Attorney, Agent, or Firm—Krass & Young

[57] ABSTRACT

A micromachined accelerometer includes two capacitors comprising a pair of fixed capacitor electrodes and an intermediate movable proof mass serving as a common electrode which is displaced under acceleration to differentially vary the capacitances. A circuit holds the common electrode at a bias voltage and a switching circuit rapidly alternating between two phases separately connects the fixed electrodes to a main reference voltage and to ground during a first phase and to a common intermediate voltage during a second phase. A charge amplifier senses capacitance changes due to acceleration to produce an output voltage and an attenuating amplifier responsive to the output voltage produces the common intermediate voltage. A compensation servo circuit responsive to the output voltage generates the bias voltage which controls an electrostatic balancing force which is applied to the proof mass during the first phase to maintain the proof mass near a rest position. Alternatively, the bias voltage is a constant value for open loop operation.

14 Claims, 2 Drawing Sheets

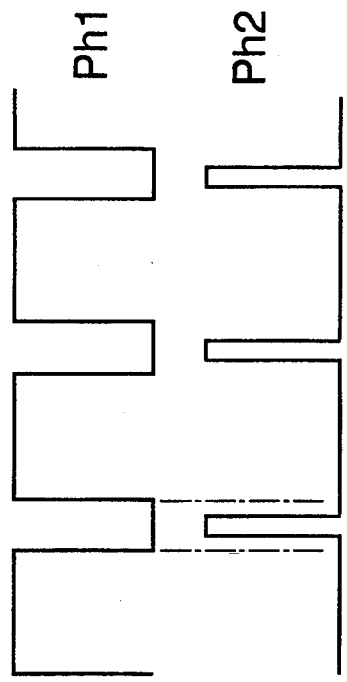
FIG - 2A
FIG - 2B
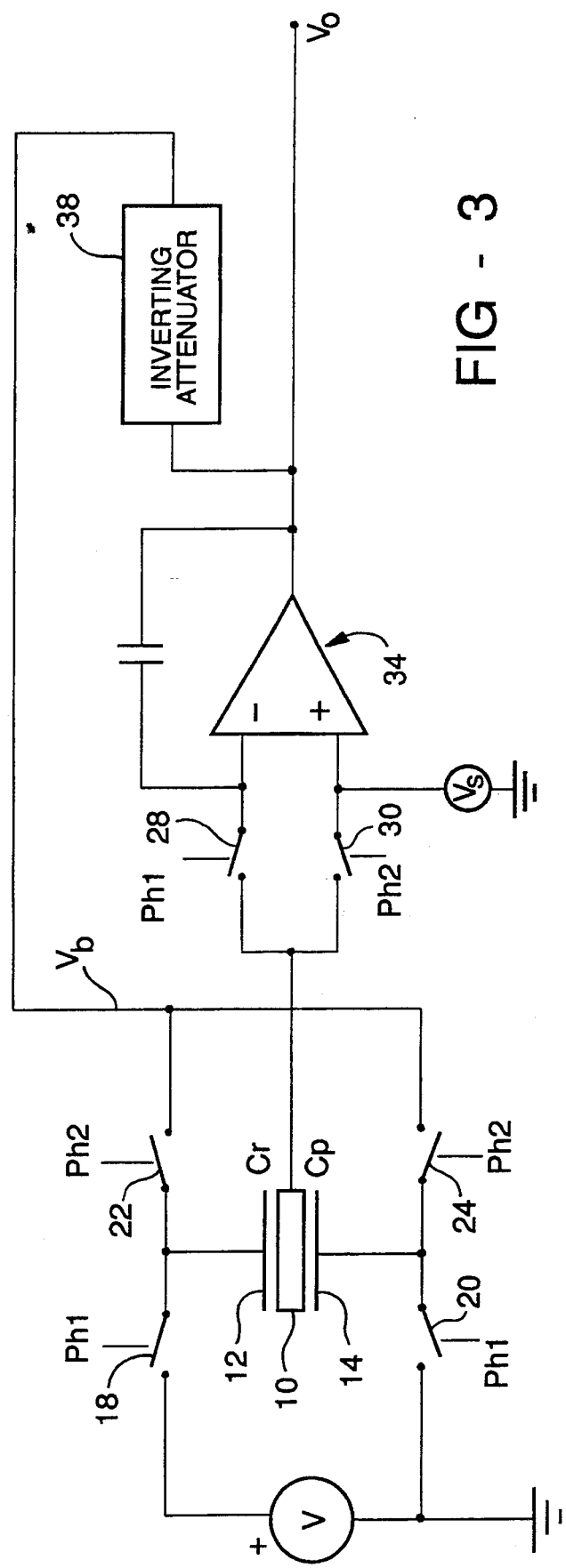
FIG - 3

SWITCHED CAPACITOR TRANSDUCER

FIELD OF THE INVENTION

This invention relates to capacitive transducers and particularly to a circuit for providing an output as a function of a parameter being sensed by a capacitive sensor.

BACKGROUND OF THE INVENTION

It is known to use a capacitance type transducer for the measurement of acceleration and other physical quantities such as pressure, fluid level, humidity, position and/or proximity of various items. In the case of at least accelerometers and pressure sensors a movable capacitor element is suspended by a resilient support near a fixed capacitor element and a force on the movable element caused by acceleration or pressure displaces the movable element against a restraining force thereby changing the capacitance. A measurement of the capacitance or the change of capacitance can then be used as a measure of the displacement and therefore of the acceleration or the pressure.

In such transducers two principle types are used depending on the restraining force. In open loop devices, the spring rate of the support provides a force which counters the input force and establishes an equilibrium position. In force balance devices, an electrical feedback signal is generated and applies a restraining force by magnetic or electrostatic attraction of the movable capacitor element. The advantage of the force balance devices is that the movable element can be held to a very small displacement, thus avoiding fatigue of the support and the consequent change of spring rate over the life of the transducer.

Typically, a capacitive accelerometer has a moveable proof mass constituting a capacitor electrode suspended between two other capacitor electrodes for movement along the axis in which acceleration is to be sensed. In the interest of compactness and integration with associated circuitry, such devices may be micromachined silicon variable capacitors. An example of such technology is shown in the article "Airbags Boom When IC Accelerometer Sees 50G", Electronic Design, Aug. 8, 1991, pp 45–56, which is incorporated herein by reference. The circuit described in that article is adaptable to both open loop and force balancing transducers. However it requires large capacitors not amenable to an integrated circuit and thus are "off-chip". The circuit further requires AC input excitation and is sensitive to frequency variations, and the balancing feedback has a high resistance coupling into the accelerometer capacitance, thus giving rise to temperature sensitivity problems.

My U.S. Pat. No. 4,467,655, entitled "Quad-Gate Demodulator Circuit for Capacitive Transducer" is an example of a circuit suited for an open loop transducer and it is not adaptable for use with force balancing. It uses quad-gate switching and it requires an AC input signal and a demodulating scheme as well as two large coupling capacitors which are external capacitors when the device is an integrated circuit.

It is desirable to provide a transducer circuit which is applicable to both open loop and force balancing transducers with only minor modification, requires no large capacitors, and is simple.

SUMMARY OF THE INVENTION

It is therefore an object of the invention to provide a capacitive transducer characterized by flexibility in application and simple circuitry. A further object is to provide such a circuit which requires no "off-chip" capacitors, no AC excitation and modulation, and has low sensitivity to frequency and temperature variations.

The invention is carried out by a capacitive transducer comprising: first and second variable capacitors comprising first and second fixed capacitor electrodes and a common capacitor electrode interposed between the first and second electrodes, the common electrode being displaceable from a rest position to vary the capacitances of the capacitors as a function of a parameter being measured; capacitance sensing means for generating an output voltage which is a function of the sensed parameter and having inverting and non-inverting inputs tied to a biasing voltage; first switch means for connecting the first and second electrodes to first and second reference voltages and for coupling the input of the capacitance sensing means to the common electrode to thereby couple the biasing voltage to the common electrode; second switch means for connecting the first and second electrodes to a variable reference voltage intermediate the first and second reference voltages and connecting the common electrode to the non-inverting input of the capacitance sensing means; means for opening and closing the first and second switch means in non-overlapping sequence; and an attenuating circuit responsive to the output voltage for generating the said variable reference voltage.

BRIEF DESCRIPTION OF THE DRAWINGS

The above and other advantages of the invention will become more apparent from the following description taken in conjunction with the accompanying drawings wherein like references refer to like parts and wherein:

FIGS. 2a and 2b are waveform diagrams illustrating switch control voltages for the circuit of FIG. 1; and FIG. 3 is a schematic diagram of another embodiment of the circuit according to the invention.

DESCRIPTION OF THE INVENTION

Figure 1:
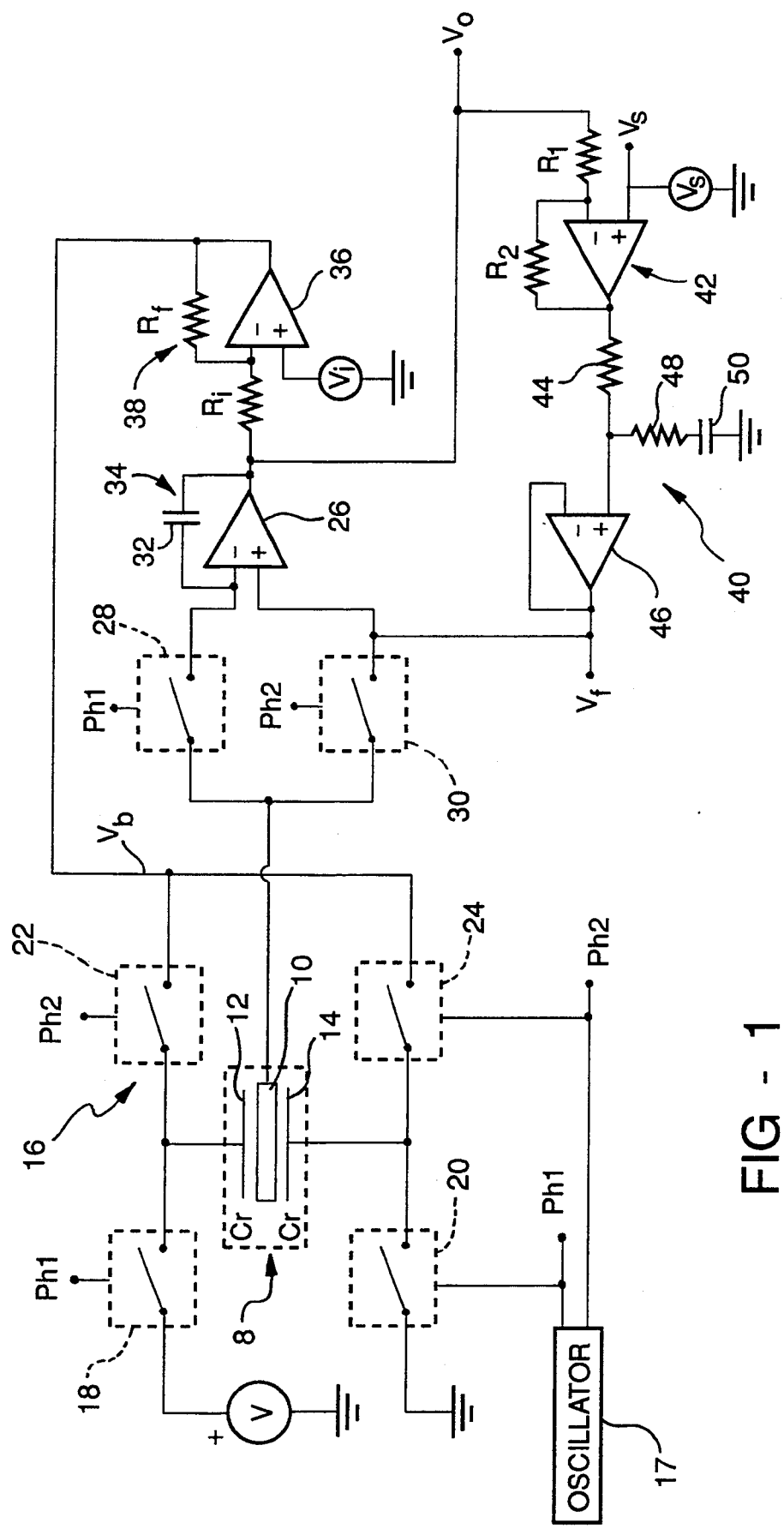
FIG. 1 is a schematic diagram of a transducer circuit according to the invention.

The ensuing description is directed to an improved capacitive transducer which was specifically developed for use as an accelerometer and it is described as such. It will be appreciated, however, that the circuit application is not limited to that usage and may be employed as another type of capacitive transducer.

Referring to FIG. 1, the transducer has a sensing unit 8 comprising a proof mass which serves as a common capacitor electrode 10 suspended between fixed electrodes 12 and 14 for movement toward one fixed electrode and away from the other when acceleration occurs normal to the plane of the proof mass. The common electrode 10 and electrode 12 form a first capacitor having capacitance $C_r$ and the common electrode 10 and the electrode 14 form a second capacitor having capacitance $C_p$.

A switching circuit 16 applies voltages to the fixed plates 12 and 14. Two sets of switches are controlled by an oscillator 17 which produces non-overlapping control signals identified in FIGS. 2a and 2b as phase 1 and phase 2 which alternate between on and off states. When phase 1 is on phase 2 is off. Phase 2 is on when phase 1 is off but the phase 2 on period is smaller than the phase 1 off period to assure that the on times do not overlap. The duty cycles of phases 1 and 2 may be equal but in the case of force balancing it is preferred to have phase 1 larger because, as will become clear below, the balancing force is applied during phase 1 and will be more effective by being applied over a larger duty cycle. For example, the phase 1 may have a 70% duty cycle while phase 2 has a 10% duty cycle. The oscillator frequency is of the order of 100 kHz.

A switch 18 connects a constant DC supply voltage V to fixed electrode 12 and switch 20 connects common or ground voltage to electrode 14, both switches being controlled by phase 1. A pair of switches 22 and 24 controlled by phase 2 connect both of the electrodes 12 and 14 to a bridge voltage $V_b$. Further, the common electrode 10 is alternately connected to the inverting and non-inverting inputs of an operational amplifier 26 by switches 28 and 30 controlled respectively by phase 1 and phase 2 signals. The switches may be any controllable devices capable of switching rapidly between high and low resistance states and may for example be C-MOS gates, junction FETs, bipolar transistors or mechanical devices.

The operational amplifier 26 has a feedback capacitor 32 coupled to the inverting input and serves as a charge integrator 34 having an output voltage $V_o$ which varies as a function of the displacement of the common electrode and thus is a function of acceleration. The output of the charge integrator 34 is coupled through an input resistor $R_i$ to the inverting input of an operational amplifier 36 having a feedback resistor $R_f$ which may be much smaller than the resistance of $R_f$. The non-inverting input is connected to a constant intermediate voltage $V_i$ which is preferably equal to V/2. The amplifier 36 and associated circuitry serve as an inverting attenuator 38 which provides the bridge voltage $V_b$ which is connected to the switches 22 and 24.

A force balancing servo compensation circuit 40 has a configuration which must be designed to accommodate the properties of the capacitive sensing unit. The representative servo circuit shown in FIG. 1 comprises an inverting unity gain amplifier 42 with input and feedback resistors $R_1$ and $R_2$, respectively, and having a positive bias of $V_s$, which is preferably equal to V/2, and its output connected to a damping circuit comprising a resistor 44 connected to the non-inverting input of a buffer amplifier 46 and a resistor 48 and capacitor 50 serially connected between that non-inverting input and ground. The output $V_f$ of the servo circuit 40 is connected to the non-inverting input of the charge integrator 34. Because both inputs of an operational amplifier are at the same voltage, the voltage $V_f$ will be applied to the proof mass 10 during phase 1. The same voltage $V_f$ will be applied to the proof mass during phase 2 via the switch 30.

In operation the proof mass 10 is centered between the electrodes 12, 14 and the capacitances are equal when there is no acceleration, but upon acceleration it is displaced slightly in one direction to change the capacitances $C_r$ and $C_p$ differentially. During the movement of the proof mass the change of the capacitances results in a charge transfer to or from the capacitor 32 of the charge integrator 34 in phase 1. That is, for given capacitances and electrode voltages a certain charge is required on the common electrode 10. During phase 1 any charge excess or deficit on the common electrode will result in charge transfer to or from the capacitor 32 of the charge integrator. (Likewise, during phase 2, any charge excess or deficit on the common electrode will be made up by current flow via the switch 30.) When steady state acceleration occurs, the charge on electrode 10 reaches equilibrium and no further charge transfer or voltage change occurs. The charge integrator output voltage $V_o$ changes as a result of the charge transfer and the bridge voltage changes as well, thus enabling capacitance measurement when steady state is reached. Because of the fractional gain of the attenuator 38 the change of bridge voltage $V_b$ is slight. The change in the servo feedback voltage $V_f$ can be substantial and provides the voltage necessary to cause a balancing force on the proof mass during phase 1. The feedback voltage $V_f$ is also a measure of acceleration. The voltages $V_f$ and $V_s$ are the circuit output signals for the force balancing embodiment of the invention and the acceleration is $a = V_f - V_s$.

Thus the alternately operated switches serve three purposes: 1) Capacitance measurement is made when the proof mass electrode 10 and other electrical systems reach steady state, 2) During phase 1 operation the switches connect the electrodes to bias voltages capable of generating a useful electrostatic force. This force is then directed to counter the acceleration force to maintain the proof mass close to its original (no acceleration) position, although some small displacement is necessary. 3) The phase 2 operation completes a cycle of the capacitance measurement. Since $V_b$ is applied to both electrodes during phase 2 of the operation, the net electrostatic force exerted on the proof mass is virtually zero. Therefore, mechanically, this phase serves as a part of a dithering cycle to eliminate hysteresis due to friction in the mechanical system. The switching frequency is chosen so that it operates much higher than the first fundamental mode of mechanical resonance. In this way the proof mass is performing both force averaging and position filtering functions.

To analyze the capacitive measurement it must be realized that the charge on a capacitor is $Q = Cv$ where C is the capacitance and V is the voltage between the electrodes, and that the opposing electrodes of the capacitor have equal and opposite charges Q and −Q. The common electrode 10 will have negative charges on one side and positive charges on the other side. For the condition of a steady state acceleration with the system at equilibrium, all voltages at the output of the amplifiers remain constant and the proof mass rests at a certain stationary position. Then no free charges are available to transfer to the charge integrator and the net charge on the proof mass 10 must be the same for phase 1 and 2. During phase 1 the charge on the proof mass is $$-(V - V_f) C_r + V_f C_p, \qquad (1)$$

and during phase 2 the charge on the proof mass is $$-(V_b - V_f) C_r - (V_b - vV_f) C_p \qquad (2).$$

Because of the conservation of charges during equilibrium the expression (1) is equal to expression (2), and it can be shown that $$V_b = V/2 (1 - (C_p - C_r)/(C_p + C_r)) \qquad (3).$$

Thus the bridge signal $V_b$ contains the capacitance information, but since the voltage $V_b$ is attenuated from the output $V_o$ of the charge integrator, $V_o$ is a larger signal than $V_b$. For a minute change of the capacitances a larger signal will be developed on $V_o$ which can be used as an amplified signal to indicate the capacitive change. From common circuit theory applied to the attenuator 38, it can be shown that $$V_o = (R_i/R_f)(V_i(R_f/R_i + 1) - V_b) \quad (4).$$

The amplification factor $R_i/R_f$ is generally much larger than unity and it is apparent that the larger this factor is the smaller the "error" is for restoring the proof mass to its non-acceleration rest position.

For the servo amplifier in steady state $$V_f = -(R_2/R_1)V_o + ((R_2/R_1) + 1)V_s. \quad (5)$$

Typical values of circuit components are:
$C_p = C_r = 2$ pf, for no acceleration,
$R_i = 100$ k ohm
$R_f = 2.381$ k ohm
$R_1 = R_2 = 50$ k ohm
$V = 5$ v
$V_i = V_s = 2.5$ v.
Then for no acceleration the equations yield $$V_b = V_o = V_f = 2.5 \text{ v}.$$

Under acceleration a, if the proof mass reaches an equilibrium position such that $C_r = 2.02$ pf and $C_p = 1.98$ pf, the equations yield:
$V_b = 2.525$ v; $V_o = 1.450021$ v; and $V_f = 3.549979$ v. The signal representing acceleration is deduced from $V_f$ as $$a = V_f - V_s = 1.049979 \text{ v}.$$

The acceleration signal a is dependent of the mass of the proof mass 10 and the capacitance characteristics of the sensing unit.

For the transient condition when acceleration changes from zero to some measurable value, the charge transfer between the proof mass 10 and the charge integrator 34 occurs in stages each time the phase 1 switches are closed so that the charge integrator output voltage $V_o$ is seen to increase over several switching cycles until a steady state is reached, but no voltage increase occurs when the phase 1 switches are open. The servo compensation circuit provides negative feedback to maintain stability during the transient. The compensation characteristics of the servo compensation circuit are designed according to the mechanical properties of the particular proof mass 10 as well as the electrical system aspects. The feedback voltage $V_f$ is a filtered function of the charge integrator output voltage $V_o$ and the two voltages are essentially the same for steady state conditions. During transients, however, the voltage $V_o$ contains spikes which hinder its use as a circuit output signal without further processing. While the charge integrator output voltage $V_o$ may be considered as a "raw" circuit output signal, the filtered signal $V_f$ is preferred as the circuit output signal for the force balancing embodiment.

Equations (3) and (4) show that the bridge voltage $V_b$ and the output voltage $V_o$ are independent of the servo feedback voltage $V_f$. This allows the capacitance measurement to be made in the absence of a feedback voltage per se, so that it can be used in an open loop system. FIG. 3 shows such an open loop system which is the same as the FIG. 1 system except that the servo compensation circuit is omitted and the bias voltage $V_s$ is applied directly to the non-inverting input of the charge integrator 34. In the open loop case, the output voltage $V_o$ is relatively stable and is suitable for use as the circuit output signal along with the voltage $V_i$.

Other features of the circuit include very practical matters of the ease of proper biasing, the obtaining of a large output signal and sensitivity adjustment without additional amplifiers, and correction for manufacturing tolerances in the capacitive sensor.

As shown by the equation (4), the output voltage is a function of the gain of the attenuator circuit. Thus either of the feedback or the input resistors $R_f$, $R_i$, may be selected or adjusted to obtain the desired sensitivity. The intermediate reference voltage $V_i$ determines the offset of the output voltage and thus can be adjusted to compensate for a manufacturing error in the neutral position of the proof mass. That is, the output voltage can be adjusted to its desired zero acceleration value even when the proof mass 10 is not ideally centered between the electrodes 12 and 14.

The variance of the proof mass from its ideal rest position can also yield a net electrostatic balancing force when none is appropriate. Adjustment of the servo compensation circuit to offset or zero that net force is accomplished by adjustment of the feedback bias voltage $V_s$.

It will thus be seen that the capacitive transducer described herein is exceptionally simple and yet flexible. It is accommodating to either open loop and force balance applications and provides a high gain with sensitivity and offset adjustment. Moreover the circuit readily compensates for manufacturing errors. No large capacitors are needed and problems with frequency and temperature sensitivity are obviated.

It will also be apparent that modifications can be made to the circuit within the purview of the invention. For example, the force balancing may be accomplished by a fixed bias voltage applied to the common electrode 10 and the reference voltages applied to the electrodes 12 and 14 during phase 1 may be varied by the servo compensation circuit.

The embodiments of the invention in which an exclusive property or privilege is claimed are defined as follows:

I claim:
1. A capacitive transducer comprising:
    first and second variable capacitors comprising first and second fixed capacitor electrodes and a common capacitor electrode interposed between the first and second electrodes, the common electrode being displaceable from a rest position to vary the capacitances of the capacitors as a function of a parameter being measured;
    capacitance sensing means for generating an output voltage which is a function of the sensed parameter and having inverting and non-inverting inputs tied to a biasing voltage;
    first switch means for connecting the first and second electrodes to first and second dc reference voltages and for coupling the input of the capacitance sensing means to the common electrode to thereby couple the biasing voltage to the common electrode;
    second switch means for connecting the first and second electrodes to a variable dc reference voltage intermediate the first and second reference voltages and connecting the common electrode to the non-inverting input of the capacitance sensing means;

means for opening and closing the first and second switch means in non-overlapping sequence; and an attenuating circuit responsive to the output voltage for generating the said variable reference voltage.

2. The invention as defined in claim 1 wherein the biasing voltage is fixed so that the transducer operates in open loop mode.

3. The invention as defined in claim 1 wherein the biasing voltage is fixed and the first and second reference voltages are variable, and including electrostatic force balancing means for maintaining the common electrode at virtually the rest position comprising a servo circuit responsive to the output voltage for generating the first and second reference voltages to impose a balancing force on the common electrode when the first switch means is closed.

4. The invention as defined in claim 1 wherein the capacitance sensing means is a charge integrator whereby during movement of the common electrode charge transfer occurs between the common electrode and the charge integrator to vary the output voltage and the reference voltage, so that at steady state the output voltage is an indication of the displacement of the common electrode.

5. The invention as defined in claim 1 further including electrostatic force balancing means for maintaining the common electrode at virtually the rest position comprising a servo circuit responsive to the output voltage for generating the biasing voltage to impose a balancing force on the common electrode when the first switch means is closed, wherein the biasing voltage is a measure of the parameter.

6. The invention as defined in claim 5 wherein the means for opening and closing the first and second switch means maintains the first switch means closed a majority of the time so that the balancing force is generated for a majority of the time.

7. A capacitive transducer comprising:

first and second variable capacitors comprising first and second fixed capacitor electrodes and a common capacitor electrode interposed between the first and second electrodes, the common electrode being displaceable from a rest position to vary the capacitances of the capacitors as a function of a parameter being measured;

a voltage source providing a common voltage, a main reference voltage and an intermediate voltage;

a charge integrator coupled to the common capacitor electrode and responsive to changes in the capacitances for generating an output voltage;

means for biasing the charge integrator input to a biasing voltage;

an attenuating amplifier having an inverting input coupled to the output of the charge integrator and a non-inverting input coupled to the intermediate reference voltage for generating a bridge signal which varies as a function of changes in the capacitances;

first and second switches for connecting the first and second electrodes to the main reference voltage and the common voltage, respectively;

a third switch for connecting the common electrode to the charge integrator input;

means for opening and closing the said first second and third switches synchronously;

fourth switches for connecting the first and second electrodes to the bridge signal and the common electrode to the biasing voltage;

means for closing the fourth switches only when the first, second and third switches are open;

whereby the common electrode is held at the biasing voltage, and charge changes on the common electrode are applied to the charge integrator to produce the output voltage in accordance with the relative capacitances of the first and second capacitors.

8. The invention as defined in claim 7 wherein the attenuating amplifier has input and feedback resistors for determining the gain, and the sensitivity of the charge integrator output voltage is determined by the gain of the attenuating amplifier.

9. The invention as defined in claim 7 wherein the intermediate reference voltage determines the offset of the output voltage and is selected to achieve a desired offset voltage.

10. A capacitive transducer comprising:

first and second variable capacitors having capacitances $C_r$ and $C_p$, respectively, comprising first and second fixed capacitor electrodes and a common capacitor electrode interposed between the first and second electrodes, the common electrode being displaceable from a rest position to vary the capacitances of the capacitors as a function of a parameter being measured;

a voltage source providing a ground voltage, a main reference voltage V and an intermediate voltage $V_i$;

a charge integrator coupled to the common capacitor electrode and responsive to changes in the capacitances for generating an output voltage $V_o$;

means for biasing the charge integrator input to a biasing voltage;

an attenuating amplifier having an inverting input coupled to the output of the charge integrator through an input resistance $R_i$ and having a feedback resistance $R_f$, and a non-inverting input coupled to the intermediate reference voltage $V_i$ for generating a bridge signal $V_b = V/2(1-(C_p-C_r)/(C_p+C_r))$;

first and second switches for connecting the first and second electrodes to the main reference voltage and the common voltage, respectively;

a third switch for connecting the common electrode to the charge integrator input;

means for opening and closing the said switches synchronously;

fourth switches for connecting the first and second electrodes to the bridge signal and the common electrode to the biasing voltage; and means for closing and reopening the fourth switches only when the first, second and third switches are open;

whereby the charge integrator produces the output voltage $V_o = (R_i/R_f)(V_i(R_f/R_i+1)-V_b)$.

11. A capacitive transducer circuit comprising:

first and second fixed capacitor plates and a third movable capacitor plate, means for mechanically suspending the third plate between the first and second plates for complemental movement relative thereto;

output circuit means having an input and an output;

first switch means having periodic operating times for connecting the first and second plates across a substantially non-varying unidirectional voltage source and, simultaneously therewith, connecting the third capacitor plate to the input of the output circuit means;

second switch means having periodic operating times for connecting the first and second plates to a common potential and, simultaneously therewith, disconnecting the third plate from said output circuit input; and means for rapidly and complementally operating the first and second switch means such that the periodic operative times thereof are non-overlapping wherein the output circuit means comprises a signal integrator, and wherein the signal integrator has inverting and non-inverting inputs, said first switch means being operative to connect the third plate to the non-inverting input and said second switch means being operative for connecting the third plate to the inverting input.

12. A capacitive transducer circuit as defined in claim 11 further including means for commonly connecting the output of the integrator circuit to the third capacitor plate and to the inverting input during the operative time of the second switch means.

13. A capacitive transducer circuit as defined in claim 11 further including force rebalance means for connecting the output circuit to the third capacitor plate during the operative times of both said first and second switch means.

14. A capacitive transducer circuit as defined in claim 11 wherein:

the first switch means comprises a first solid state switch connected between said unidirectional voltage source and said first plate and a second solid state switch connected between said second plate and a reference potential such as ground and a third solid state switch connected between said third plate and a non-inverting input of the output circuit means; and said second switch means comprises fourth and fifth solid state switches, each connected between said first and second plates and the common potential, and a sixth solid state switch connected between said third plate and the output of the said output circuit means, respectively, the switching rate being greater than the first fundamental mode of mechanical resonance of the third plate suspension means.

* * * * *